Dec. 30, 1958  D. C. JOHNSON ET AL  2,866,270
ANGLE DETERMINATOR AND BISECTOR
Filed March 19, 1954
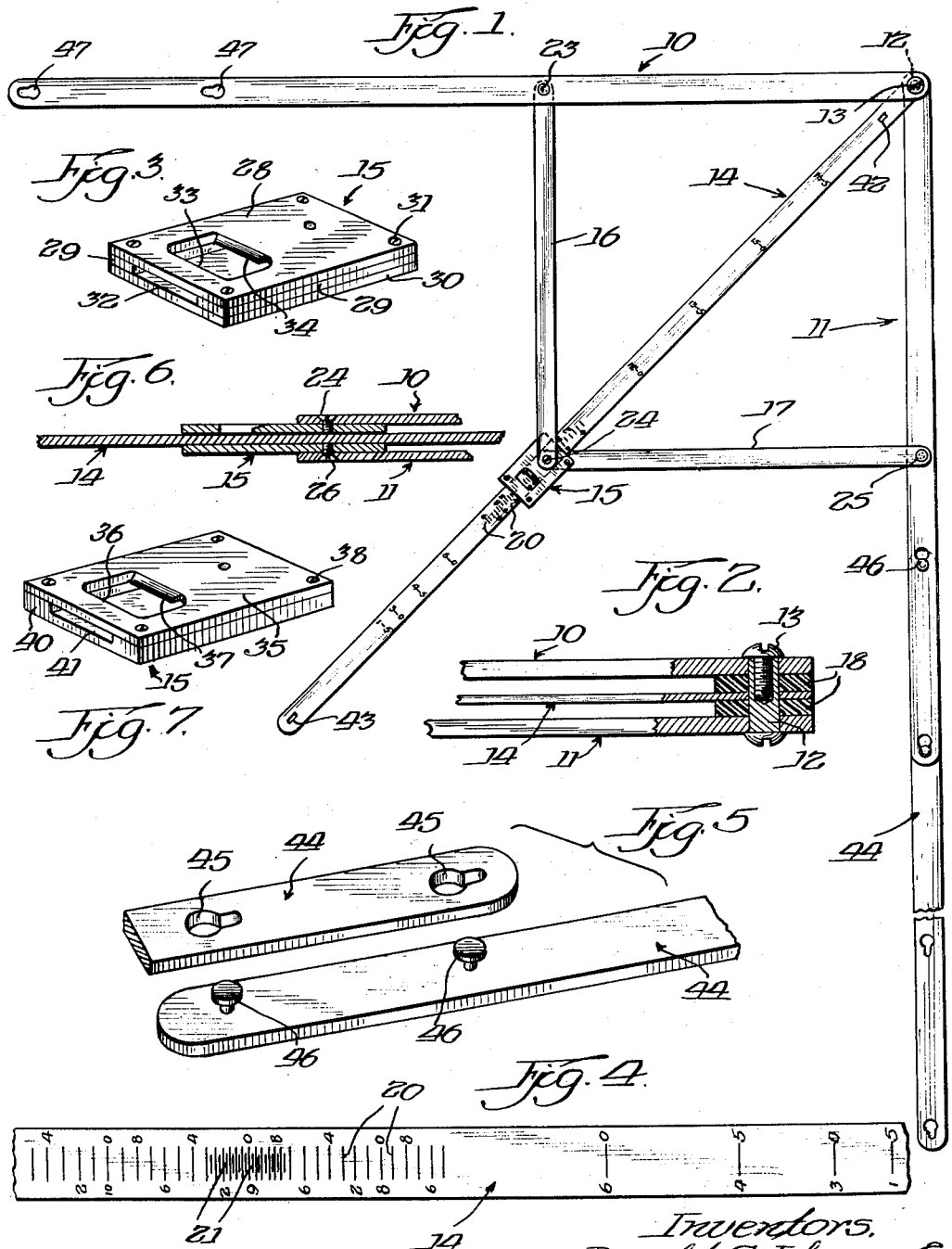
Inventors.
Donald C. Johnson, &
Douglas L. Johnson.

United States Patent Office 2,866,270
Patented Dec. 30, 1958

2,866,270

ANGLE DETERMINATOR AND BISECTOR

Donald Clair Johnson and Douglas L. Johnson,
Flossmoor, Ill.

Application March 19, 1954, Serial No. 417,352

2 Claims. (Cl. 33—91)

The invention relates to measuring instruments and has reference more particularly to an angle determinator and bisector for use by carpenters, mechanics and other craftsmen, in the measuring of angles and for determining the bisector of any angle thus measured.

The invention has for its primary object the provision of an angle measuring device which will be rugged and durable in construction, simple in design and in operation, embodying relatively few parts, and which will be capable of a high degree of accuracy in measuring angles and in determining the bisectors thereof.

Another object is to provide an angle measuring device consisting of metal strips which are pivoted together and connected by links in a novel and unique manner whereby the device can be folded into a collapsed form and which will simulate a ruler or the like since the metal strips and links of the device when in said collapsed form will be disposed in stacked or overlying relation.

A further object resides in the provision of an improved measuring device for accurately measuring inside angles ranging from approximately 20 degrees to 160 degrees, which will have foldable ability as above described, and wherein the metal strips and links of the device are also reversible in either direction from their folded collapsed relation.

A still further object is to provide an angle measuring device which will incorporate a median or middle strip constituting the angle bisecting member of the device, and wherein a sight gauge is slidably mounted on the angle bisecting member and which indicates the magnitude of the angle measured by its particular positioning longitudinally of the member.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts—

Figure 1 is a plan view of the angle measuring device of the invention in expanded operative relation for indicating an angle of substantially 90 degrees;

Figure 2 is a fragmentary detail sectional view illustrating the constructional details of the pivot end of the device;

Figure 3 is a perspective view of a sight gauge illustrated one preferred form;

Figure 4 is a fragmentary plan view of the angle bisecting member of the device showing the character of the indicia thereon for indicating the angles in degrees;

Figure 5 is a perspective view illustrating the manner of affixing extensions to the leg members of the present measuring device;

Figure 6 is a longitudinal sectional view showing a sight gauge in mounted relation on the angle bisecting member and the pivotal connection of the links therewith; and Figure 7 is a perspective view of a modified form of sight gauge.

Referring to the drawings and particularly Figure 1, the angle measuring device selected for illustrating the invention essentially consists of a pair of leg members 10 and 11, formed by elongated strips, preferably of metal, and which are pivoted together at one end by the pivot member 12 and retaining screw 13. The device is completed by the bisector 14, the sight member 15, and by the links 16 and 17.

The bisector 14 also consists of an elongated strip, preferably of metal, and the same is pivotally connected at one end to the leg members by means of the said pivot member 12 and retaining screw 13, the said pivot 12 joining all three parts, with the bisector being located in the middle between the top leg member 10 and the bottom leg member 11. The spacing washers 18 serve to space the several strips from each other. The bisector 14 is provided with numerical indicia on at least one side thereof, the same being generally illustrated in Figure 1 by numeral 20 and, as best shown in Figure 4, may consist of angle designations ranging from 15 to 165 degrees and which may be sub-divided into fractions of a degree by lines of lesser width such as 21.

The sight member 15 is mounted on the bisector 14 and is adapted to move longitudinally of the bisector in the operation of the device, the particular positioning of the sight member on the bisector indicating the size of the angle formed by the extended relation of the leg members. The sight member and the leg members have an operative connected relation by means of the links 16 and 17 which effect movement of the sight member on the bisector as the leg members are extended to a varying extent in the operation of measuring angles of different size within the limits of the device. The link 16 is pivoted at one end as at 23 to the underside of the leg member 10 and said link is pivoted at its other end to the top surface of sight member 15 by the screw 24. The link 17 is pivoted at one end as at 25 to the underside, that is, the inside surface of leg member 11, and said link is pivotally secured at its opposite end by screw 26 to the bottom surface of sight member 15. The screws 24 and 26 on the top and bottom sides, respectively, of the sight member, are in vertical alignment and thus the screws form a common vertical axis for the links 16 and 17. Said links are equal in length and the pivots 23 and 25 are spaced equal distances from the center pivot member 12. It will also be noted that the spacing of the pivots 23 and 24 from pivot member 12 is the same as the length of the links as measured from the common vertical axis 24—26 to said pivot connection, whereby a perfect square is formed when the leg members are extended to form a 90 degree angle and parallelograms are formed when the leg members are extended for measuring angles either greater or smaller than 90 degrees.

The sight member 15, as shown in Figure 3, is formed of a top plate 28 and a bottom plate 30, with the plates being spaced by intermediate sections 29. The plates and the sections are secured together by the screws 31 and the sections are located on respective sides of the member to form a central longitudinal passage 32 for receiving the bisector. The width of the passage and the height of the same are such as to allow the sight member to slide freely on the bisector so that the window 33 and the straight edge 34 formed in the top member 28 are positioned with respect to the indicia 20 and 21 for indicating to the operator the size of the measured angle.

Figure 7 illustrates a modified form of sight member wherein the top plate 35 having the window 36 and the straight edge 37 is secured by screws 38 to the bottom member 40 which is grooved to provide the central longitudinal passage 41. In this form of the sight member the groove has the proper width and height for freely accommodating the bisector.

The device of the invention is particularly useful to carpenters, mechanics and similar craftsmen in the drawing or laying out of angles of different size and in the measuring of various inside angles within the limits of the device which may range from 15 degrees to 165 degrees. The indicia on the bisector 14 has been so calibrated that the positioning of the sight member 15 will locate the straight edge 34 so as to indicate the particular size of the angle for the various extended positions of the leg members. When the leg members are positioned at 90 degrees, as shown in Figure 1, the links 16 and 17 comprise the respective sides of a square and the sight member is accordingly positioned exactly on the 90 degree mark. For angles greater or less than 90 degrees the links in combination with the leg members will form parallelograms, although in all cases the bisector 14 will precisely divide the measured angle in half, and, should the operator desire to scribe a mark such as will indicate the bisector of the measured angle, the member 14 is provided with longitudinal slots at respective ends such as 42 and 43. In the measuring of some angles it may be desirable to extend the length of the leg members 10 and 11, and, in accordance with the invention, this can be done by adding the extensions 44 thereto. Each extension 44 consists of a flat strip, preferably of metal, similar in all respects to the leg members, but which are provided at one end with bayonet slots such as 45, and at their other end with pins such as 46. With respect to leg member 10, the end thereof opposite the pivot member 12 may be formed with bayonet slots such as 47 and the outer end of leg member 11 is formed with similar bayonet slots. For affixing an extension to either leg it is only necessary to associate the end of the extension having the pins 46 with the bayonet slots 47 of the leg member, and by locating the pins in the narrow recesses of the bayonet slots the extensions will be securely held in place. If desired, additional extensions may be added to increase the length of the leg members to the size required by the operator.

An important feature of the present angle measuring device resides in the foldability of the links and leg members with respect to the bisector. The several parts can be folded whereby they have stacked or overlying relation with each other so that the device substantially simulates a ruler when in collapsed form. Also in extending the leg members it is worthy of note that they are reversible so that leg member 11 could be extended upwardly to take the place of 10, and leg member 10 can be extended downwardly to take the place of 11. This collapsibility and reversibility of the present angle measuring device is made possible by the particular pivoting action which has been selected for the links 16 and 17. With link 16 pivoted to the top surface of the sight member it will be seen that its other end is pivoted to the underside of leg member 10. Also with link 17, which is pivoted to the bottom surface of the sight member, its other end is pivoted to the underside, that is, the inside surface of leg member 11. This constructional feature allows the leg members and links to fold into a stacked relation with the bisector 14 and wherein all the strips will be disposed in vertical alignment. For rendering the device operative it is possible to extend each of the leg members on either side of the bisector by reason of the reversibility features as above described.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In an angle determinator and bisecting device, in combination, a pair of elongated flat strips of suitable material forming leg members, a central flat strip constituting a bisector and disposed between the leg members and which are thereby located above and below the bisector, pivot means located at one end of the leg members and bisector for pivotally securing the several strips together, a sight gauge mounted on the bisector and being slidable thereon, a pair of links pivotally connected to the sight gauge and to the leg members respectively at points spaced from the pivot means, one link being pivoted to the top surface of the sight gauge and to the inside surface of one of said leg members, and the other link being pivoted to the bottom surface of the sight gauge and to the inside surface of the other leg member, whereby the links can be folded into overlying relation for collapsing the device and whereby the leg members are pivotally reversible since they can be extended on either side of the bisector, said sight gauge being formed of at least two superposed plates approximately rectangular in shape with one plate being disposed above and the other plate below the bisector, the top plate of the sight gauge having a window therein providing a straight edge for positionable association with indicia on the bisector, and washers located at the pivot means for respectively spacing the leg members from the bisector.

2. An angle determinator and bisecting device as defined by claim 1, wherein each leg member has bayonet slots formed therein adjacent their free extending end for releasably attaching an extension to the leg member.

References Cited in the file of this patent

UNITED STATES PATENTS

| 451,810 | Cowgill | May 5, 1891 |
| 678,005 | Myers | July 9, 1901 |
| 797,453 | Nagel | Aug. 15, 1905 |
| 1,109,479 | Steed | Sept. 1, 1914 |
| 1,678,019 | Oates | July 24, 1928 |
| 2,300,401 | Basler | Nov. 3, 1942 |
| 2,487,451 | Kurmer | Nov. 8, 1949 |
| 2,556,839 | Cretella | June 12, 1951 |

FOREIGN PATENTS

| 2,853 | Austria | Aug. 1, 1900 |
| 848,090 | Germany | Sept. 1, 1952 |